(12) United States Patent
Suzuki et al.

(10) Patent No.: US 6,203,093 B1
(45) Date of Patent: Mar. 20, 2001

(54) MOTORCYCLE FAIRING

(75) Inventors: Yasuhito Suzuki; Akira Hiratsuka; Shinya Anzai, all of Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/427,856

(22) Filed: Oct. 27, 1999

(30) Foreign Application Priority Data

Oct. 27, 1998 (JP) .................................................. 10-305162

(51) Int. Cl.[7] .............................. B62J 17/00; B62H 1/00
(52) U.S. Cl. ............................................................ 296/78.1
(58) Field of Search ................................. 296/77.1, 78.1; 280/288.4

(56) References Cited

U.S. PATENT DOCUMENTS

| | | | |
|---|---|---|---|
| 4,461,508 | * 7/1984 | Ogishima | 296/78.1 |
| 4,515,405 | * 5/1985 | Ogishima | 296/78.1 |
| 4,709,774 | * 12/1987 | Saito et al. | 296/78.1 |
| 4,822,067 | 4/1989 | Matsuo et al. | 280/152.1 |
| 4,838,603 | 6/1989 | Masoero et al. | 296/180.1 |
| 5,109,942 | * 5/1992 | Akimori et al. | 280/288.4 |
| 5,409,287 | 4/1995 | Suzuki | 296/180.1 |
| 5,857,727 | * 1/1999 | Vetter | 296/78.1 |

* cited by examiner

Primary Examiner—D. Glenn Dayoan
Assistant Examiner—Hiliary Gutman
(74) Attorney, Agent, or Firm—Knobbe, Martens, Olson & Bear, LLP

(57) ABSTRACT

A motorcycle features an improved fairing. The fairing generally comprises a forward panel and a rear panel. The forward panel includes an aperture for a headlight while the rear panel includes apertures for gauges and speakers. By removing the forward panel, a mounting stay and a cavity are revealed. The headlight and the various features secured in the rear panel are mounted to the stay within the cavity. The stay is connected to the frame of the motorcycle and carries the weight of the fairing. An engaging member positively locates the headlight within the forward panel of the fairing when the forward panel is reattached to the motorcycle following maintenance. When the forward panel removed for maintenance, an opening is provided into the cavity defined between the forward panel and the rear panel and the cavity is exposed in both forward and lateral directions.

30 Claims, 15 Drawing Sheets

MOTORCYCLE FAIRING

BACKGROUND OF THE INVENTION

1. Field of the Invention

The present invention generally relates to motorcycle fairings. More particularly, the present invention relates to an improved construction of such fairings to improve the serviceability of components housed therein.

2. Related Art

Motorcycles are often provided with fairings which reduce wind resistance and improve the overall aesthetic appearance of motorcycles. The fairing is commonly mounted to the frame of the motorcycle and provides a forward facing housing member, which reduces the air resistance of the motorcycle as the motorcycle is driven. Such fairings often accommodate a headlight as well as various gauge members for the motorcycle. For instance, an inner panel of the fairing can include a speedometer, an oil pressure meter, as well as a temperature meter. Additionally, a radio and speakers can be positioned to extend through the inner panel.

An outer panel forms the aerodynamic forward facing covering of the motorcycle. A small portion of this outer panel usually can be removed to service some of the components mounted to the inner panel, as well as to service the headlight and the turning indicators. However, the portion of the outer panel which can be removed typically forms a small, forward-facing portion of the fairing and, consequently, only a small maintenance opening is provided into the fairing.

In addition, due to the mounting arrangement used for the fairing and the outer panel, the fairing and the outer panel tend to be heavy and awkward to install and remove during maintenance. One aspect of this awkwardness involves mounting the headlight within the forward portion of the fairing. During repeated removals of the fairing, the headlight which is mounted within the fairing is often inserted and removed several times. Due to the repetitive nature of such maintenance, the headlight is often skewed relative to the fairing over time.

This results in air gaps as well as unattractive gaps being formed within the forward facing portion of the fairing.

SUMMARY OF THE INVENTION

Accordingly, an improved motorcycle fairing is desired. The fairing desirably comprises an enlarged forward panel which also covers a portion of the sides of the fairing such that, upon removal, an enlarged maintenance opening results that can expose both the forward and side portions of components mounted within the inner panel of the fairing. In addition, the mounting arrangement for the fairing desirably has a reduced weight as well as an upwardly disposed fastening member that allows the fairing to be temporarily and stably positioned on the motorcycle prior to being secured. Moreover, the headlight is preferably engageable with a portion of the fairing such that the headlight is positively positioned within the fairing in a consistent location each time the fairing or forward panel is replaced after maintenance.

Accordingly, one aspect of the present invention involves a fairing assembly for attaching to a frame of a motorcycle. The fairing assembly comprises at least one mounting bracket. The mounting bracket is capable of being connected to a forward portion of the frame of the motorcycle. A fairing stay is removably connected to the mounting bracket. A forward fairing panel is connected to the fairing stay and a rearward fairing panel is connected to the fairing stay. The forward fairing panel is removable from the fairing stay separate from the rearward fairing panel such that the forward fairing panel may be removed from the fairing stay while the rearward fairing panel remains connected to the fairing stay. A cavity is defined between the forward fairing panel and the rearward fairing panel. The fairing stay supports at least one accessory disposed substantially within the cavity such that the rearward fairing panel, the accessory and the stay may be removed from the mounting bracket as a single component.

Another aspect of the present invention involves a motorcycle comprising a frame assembly, a front fork pivotably connected to the frame assembly, and handlebars attached to the front fork. A fairing stay is removably secured to a forward portion of the frame assembly. At least one accessory is mounted to the fairing stay proximate the handlebars. An outer panel is removably attached to the fairing stay and extends outward and rearward from a forwardmost portion such that the outer panel has a generally concave appearance to an operator. An inner panel also is removably attached to the stay. A windshield extends upward from an upper edge of the outer panel and is interposed between the outer panel and the inner panel at a lower edge of the windshield. The outer panel is removable from the motorcycle without removing the stay, the inner panel or the windshield. The outer panel conceals front and lateral sides of a cavity housing the accessory.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT OF THE PRESENT INVENTION

Figure 1:
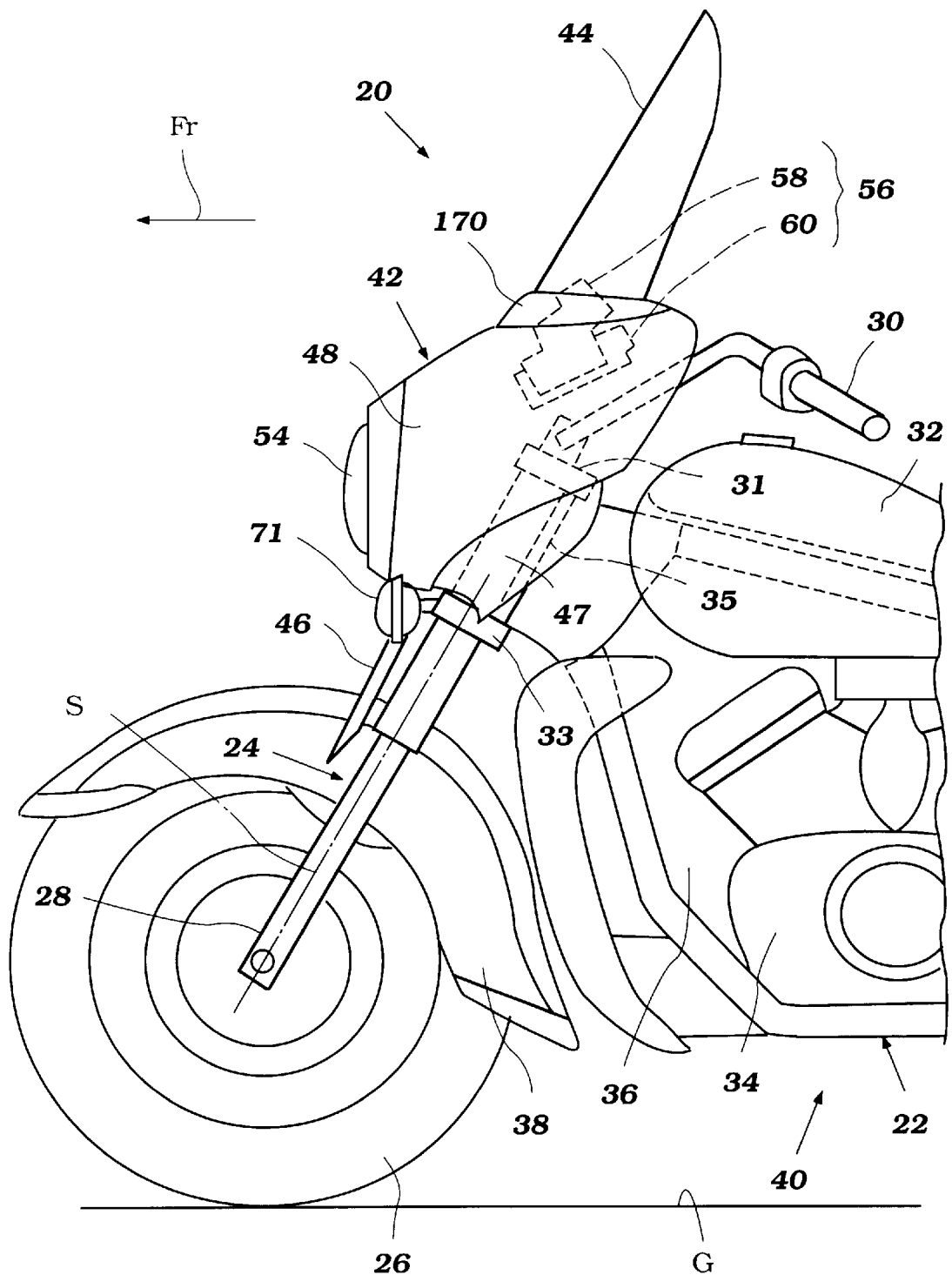
FIG. 1 is a forward portion of a motorcycle having a fairing arranged and configured in accordance with the present invention, with certain internal components illustrated in dashed lines.
Figure 2:
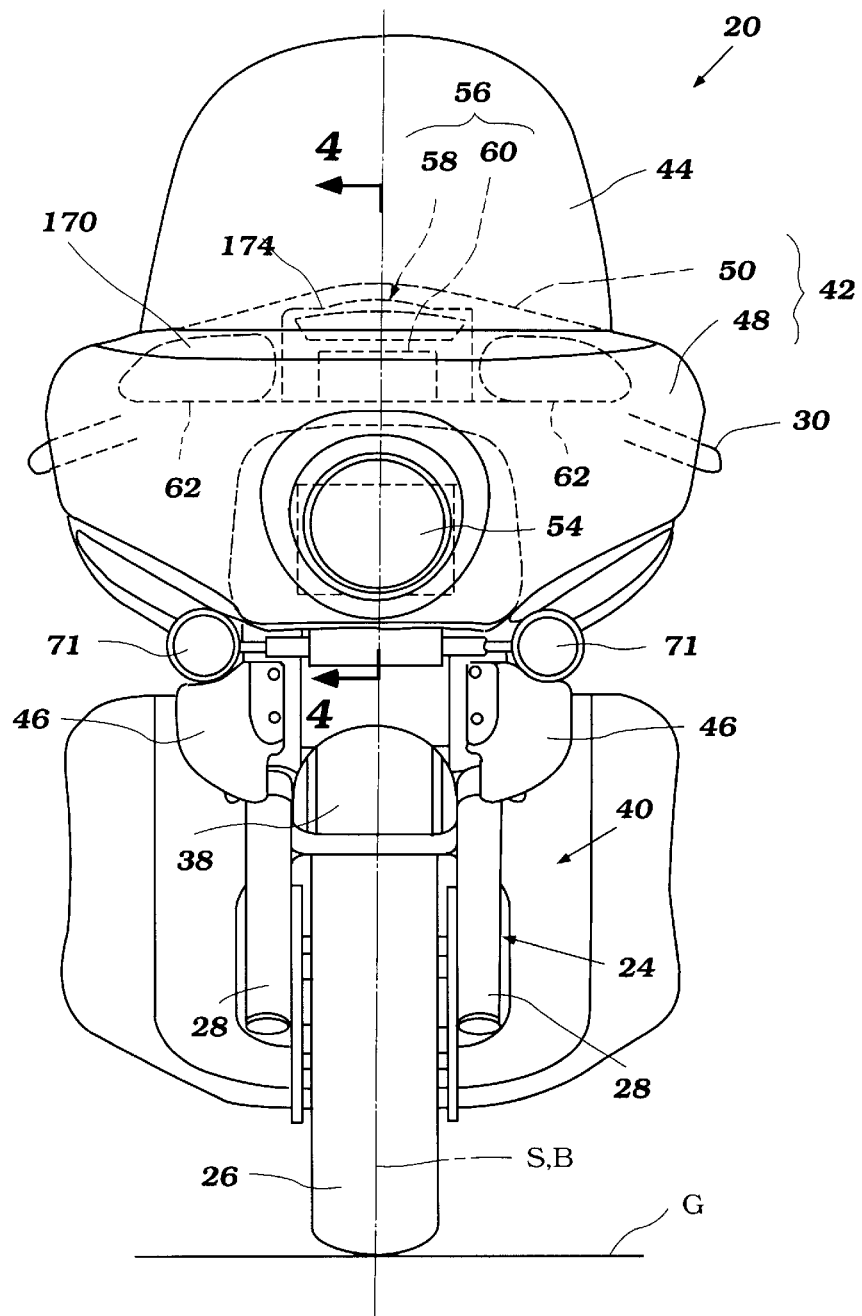
FIG. 2 is a front view of the motorcycle of FIG. 1.
Figure 3:
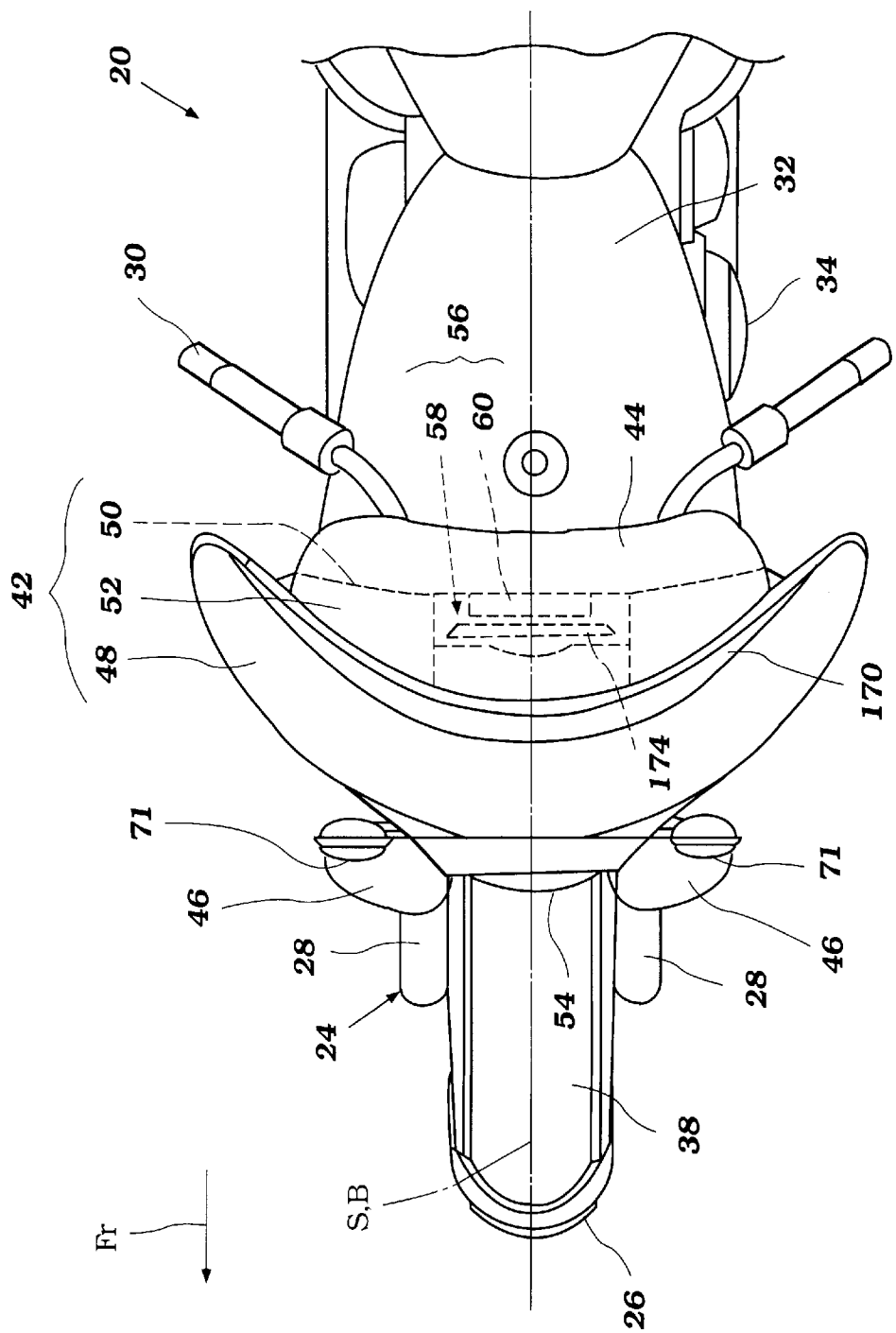
FIG. 3 is a top plan view of the portion of the motorcycle of FIG. 1.

With reference initially to FIGS. 1–3, a front portion of a motorcycle is illustrated therein. The motorcycle, generally indicated by the reference numeral 20, may be of any type or construction of motorcycle. The motorcycle 20 provides an environment in which a fairing constructed and mounted in accordance with the present invention may find particular utility. Of course, other environments of use may readily appear to those of ordinary skill in the art.

As is known, the motorcycle 20 includes a frame 22. Preferably, the frame 22 is a welded up assembly of components. A front fork 24 supports a front wheel 26 and is pivoted for steering movement relative to a front portion of the frame 22. Preferably, a fork pipe 28 extends along both sides of the wheel 26 and the wheel 26 is joined thereto. Steering movement of the front wheel 26 preferably occurs relative to an axis indicated generally by the reference letter S in FIG. 1. As illustrated, this axis S is preferably inclined relative to the ground G.

As is well known to those of ordinary skill in the art, the upper portion of the front fork 24 preferably is attached to the head pipe 35 through upper and lower bridges, indicated generally by the reference numerals 31 and 33. A handle 30 is mounted on the upper bridge 31 and is configured to allow an operator of the motorcycle 20 to steer the front wheel 26 in manners well known to those of ordinary skill in the art. A fuel tank 32 is preferably positioned behind the handle bar 30 and mounted to the frame 22 in any suitable manner. An engine 34 is disposed under at least a portion of the fuel tank 32 in an engine compartment 36 defined within the frame 22.

In the illustrated motorcycle, a front fender 38 is attached to the front forks 24 and covers at least a portion of the front wheel 26. The fender 38 is well known to those of ordinary skill in the art.

With continued reference to FIGS. 1–3, a body indicated generally by the reference numeral 40 is mounted to the frame 22. The body 40 preferably includes a fairing 42. The fairing 42 reduces the wind resistance of the motorcycle 20 as the motorcycle is driven forward in a direction indicated by the arrow FR. The fairing 42 is attached to a forward portion of the frame 22 in a manner which will be described. The fairing 42 also includes a windshield 44 that is attached to an upper portion of the fairing 42 in a manner which will also be described. Moreover, the fairing 42 includes a set of shields 46, 47 that are positioned to either side of the front fender 38 and that help to reduce the wind resistance of the motorcycle 20.

With continued reference to FIGS. 1–3, the fairing 42 preferably comprises a forward facing outer panel 48 and a rearward facing inner panel 50. As best illustrated in FIG. 3, the outer panel 48 is formed in a generally concave shape with the handle bars positioned within the concavity. As such, the outer panel extends rearward and outward from its forwardmost centralized portion.

The inner panel 50 is attached to the outer panel 48 in manners which will be described below. The inner panel 50 preferably extends in a generally transverse direction relative to a longitudinally extending bisecting plane indicated by the line B in FIGS. 2 and 3.

A cavity 52 is generally defined between the outer panel 48 and the inner panel 50. As illustrated, the cavity 52 receives a number of components which are mounted within the outer panel 48 and inner panel 50. For instance, the headlight, which is indicated generally by the reference numeral 54, is mounted in the illustrated outer panel 48 in manners which will be described below. Various electronic components 56 also are mounted to the inner panel 50. The electronic components may include, for instance but without limitation, a display unit 58 capable of outputting data reflective of operating conditions of the motorcycle 20 (i.e., speed, oil pressure, temperature). Additionally, the electronic components 56 may include an audio unit 60 such as a CB, short-wave radio, AM/FM radio, scanner, or the like. With reference to FIG. 2, the audio unit 60 preferably communicates with a pair of speakers 62 that are also mounted to the inner panel of the fairing 42.

Figure 4:
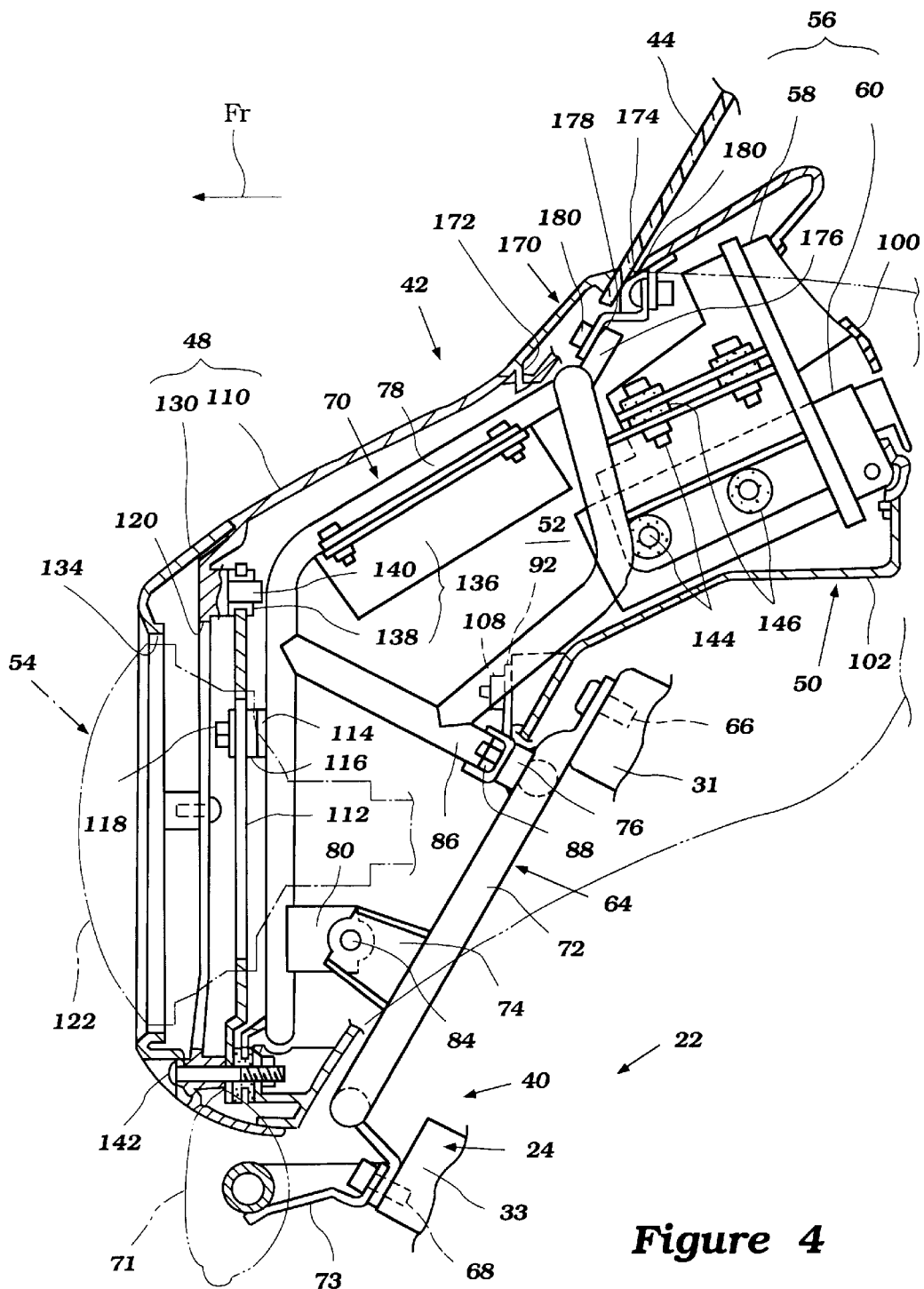
FIG. 4 is an enlarged sectioned view of the motorcycle of FIG. 1 taken along the line 4—4 in FIG. 2.

With reference now to FIG. 4, the mounting arrangements of the various components will be described in detail. Preferably, the fairing 42 is attached to the frame of the motorcycle 20 at the upper and lower bridges 31, 33. As illustrated, a bracket, which is indicated generally by the reference numeral 64, is attached to the upper bridge 31 and the lower bridge 33 through the use of threaded fasteners 66, 68, respectively. The bracket 64 preferably extends between the upper bridge 31 and the lower bridge 33 and provides a mounting position for a fairing stay, which is indicated generally by the reference numeral 70.

With continued reference to FIG. 4, a turn signal indicator or flasher 71 is preferably mounted to the lower bridge 33 through a lower bracket 73 which is also connected to the lower bridge 33 by the threaded fastener 68. As illustrated in FIG. 2, the turning flashers 71 extend to both sides of the front wheel 26 and are used as turn signal or hazard lights in the illustrated motorcycle 20. The mounting of the flashers will be further described below.

With reference again to FIG. 4, a main body 72 of the bracket 64 includes a first flange 74 and a second flange 76. As will be understood from FIGS. 5 and 7, the motorcycle 20 preferably includes a pair of brackets 64 that extend along either side of the longitudinally extending bisecting plane B. With reference to FIG. 8, both of these flanges 74, 76 preferably extend upward at an inclined angle relative to a generally horizontally extending plane. Of course, this is, in part, due to the disparate longitudinal positioning of the lower bridge 33 and the upper bridge 31 such that the main body 72 of the bracket 64 must extend at an angle between the bridges 31, 33.

Figure 5:
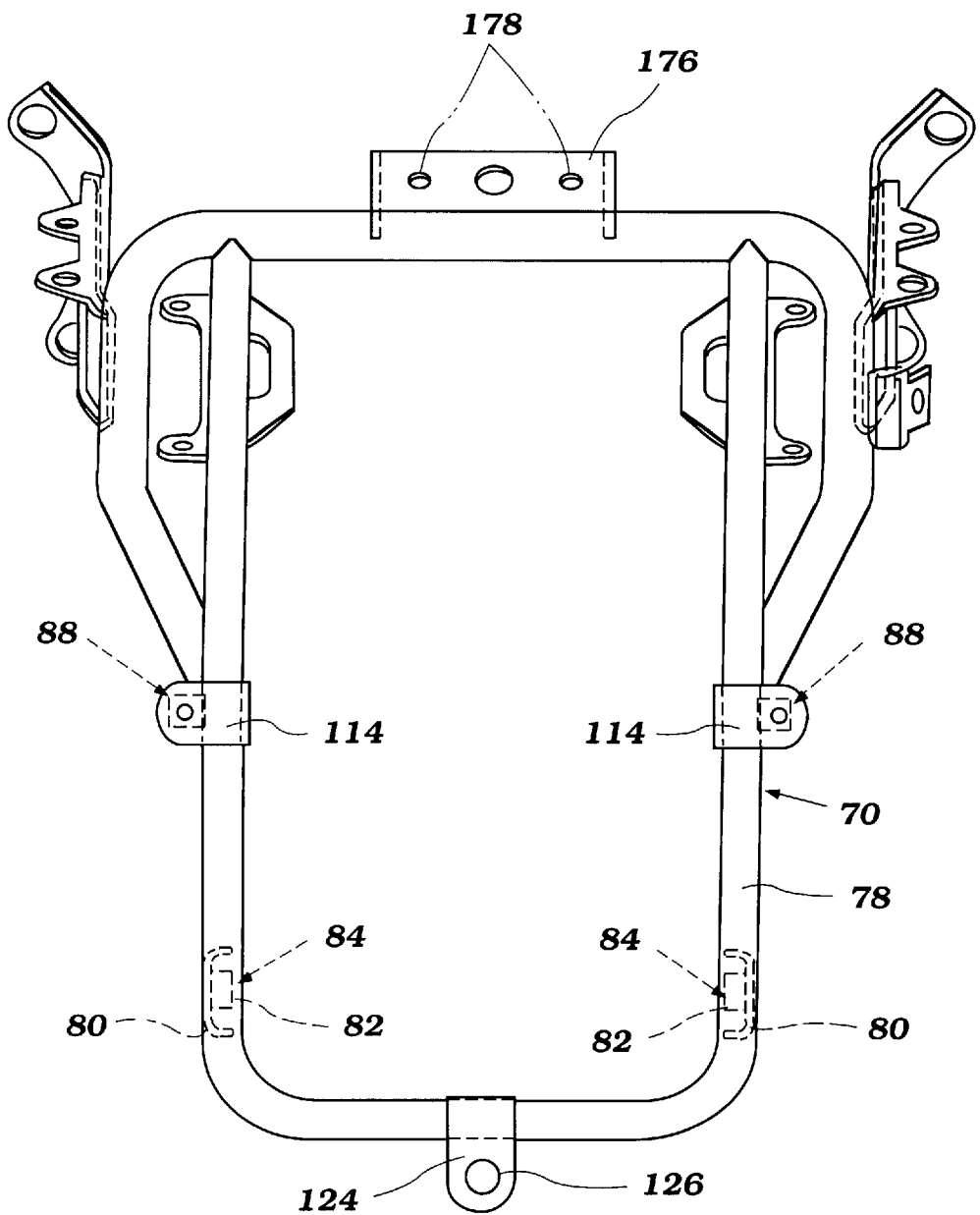
FIG. 5 is a front plan view of a mounting stay useful for mounting a fairing to the motorcycle of FIG. 1.

With reference now to FIG. 5, the fairing stay 70 will be described in greater detail. As illustrated, the fairing stay 70 generally forms a rectangular yoke through which the fairing and a plurality of components may be attached to the frame of the motorcycle 20. Preferably, a main body 78 of the stay 70 is formed in a generally rectangular shape by a plurality of tubular members. With reference to FIG. 4, the stay 70 is formed in a dog-leg shape in side view (i.e., two portions separated by a bend) with a generally vertically extending portion and an inclined portion.

The generally vertically extending portion includes a lower support piece 80 that preferably extends rearward for connection to the first flange 74 of the bracket 64. As such, the lower support piece 80 generally comprises a weld nut or other threaded fastening portion which is indicated by the reference numeral 82 in the illustrated stay 70. This allows the stay 70 to be attached to the bracket 64 through the use of a threaded fastener that extends from the bracket 64 outward. By putting the threaded fastener 84 on the bracket 64 rather than the stay 70, the stay has a reduced weight relative to a stay having a threaded fastener mounted on the stay itself.

With continued reference to FIGS. 4 and 5, the main body 78 of the stay 70 also includes a downwardly and rearwardly extending upper support piece 86. The upper support piece 86 preferably connects the stay 70 to an upper portion of the main body 72 of the bracket 64. More preferably, a threaded fastener 88 extends at an upwardly inclined angle relative to horizontal to connect the upper support piece 86 to the bracket (64). The illustrated upper support piece 86, therefore, includes an opening (not shown) that allows the stay 70 to be temporarily positioned on the fastener 88 of the bracket 64 such that it is temporarily mounted to the bracket 64 in a fairly stable condition. This allows the stay 70 to be easily removed and reattached to the bracket 64 while relying on gravity to secure the stay 70 in position for a short period of time while securing the stay 70 to the bracket 64 using nuts or other suitable methods.

With continued reference to FIG. 8, the upper support piece 86 is connected to an upper portion of the main body 72 of the bracket 64. As illustrated, the upper support piece includes a carrying flange 92 that extends-upward and away from the main body 72 of the bracket 64. Preferably, a threaded fastener 94 extends through a hole 96 and is welded into position or otherwise suitably secured into position within the hole 96, such as that illustrated in FIG. 8. Once the upper support piece 86 is properly positioned over the bolt 94 a nut 98 may be used to secure the upper support piece 86 to the main body 72 of the bracket 64. Specifically the upper support piece 86 may be connected to the second flange 76.

With reference now to FIG. 8, the mounting arrangement between the fairing stay 70 and the bracket 64 will be described in further detail.

The lower support piece 80 is connected to the first flange 74 in any suitable manner. In the illustrated embodiment, the lower fastener 84 generally comprises the nut 82 which is welded or otherwise secured to the lower support piece 80 and a threaded fastener 90 which extends from the first flange 74 into the lower support piece 80 and through the nut 82. Once the upper support piece 86 of the stay 70 is attached to the bracket 64, the lower support piece and the bracket may be fastened together.

With continued reference to FIGS. 4 and 8, the inner panel 50 of the fairing 42 generally comprises an upper panel 100 and a lower panel 102 that are connected to the frame 22 (not shown in FIGS. 4 and 8) through the upper and lower bridges 31, 33 in a manner which will now be described. Specifically with reference to FIG. 8, the illustrated stay 70 preferably includes the carrying flange 92. As illustrated the lower panel 102 of the inner panel 50 is suitably secured to the carrying flange 92 through the use of a resilient grommet 104 and a threaded fastener 106. The grommet 104 may be manufactured from any suitable resilient material and preferably is made from a soft rubber compound.

The resilient grommet 104 desirably reduces the vibrations transmitted from the frame 22 to the fairing 42. The illustrated threaded fastener 106 extends through the grommet 104 and attaches the lower panel 102 to the carrying flange 92 with a nut 108 or other suitable coupling device. As illustrated in FIG. 8, preferably the grommet 104 is interposed between the surfaces of the carrying flange 92 and the lower panel 102.

A body 110 of the outer panel 48 is also removably connected to the stay 70 to form an outer shell around the head light 54. The shell advantageously wraps outwardly and rearwardly from the head light 54. As discussed above the outer panel 48 desirably reduces the wind resistance of the motorcycle 20 as is being driven in the direction FR.

With reference to FIG. 4, a fairing and headlight support 112 is connected to the generally vertically extending portion of the stay 70 through any suitable manner. In the illustrated motorcycle 20, the support 112 is connected to the stay 70 through the use of mounting bosses 114 carried by the stay 70. Resilient dampers 116 are preferably positioned between the support 112 and the stay 70 to reduce the vibrational energy transfer from the frame 22 through the stay 70 and into the outer panel 48 of the fairing 42. A threaded fastener 118 is desirably used to connect the support 112 to the bosses 114 of the stay 70. Of course other suitable methods of connecting the members together may also be used in other applications.

Preferably the support 112 is a ring shaped plate member to which the body 110 of the outer panel 48 may be connected. Moreover, the support 112 preferably includes an opening 120 through which a body 122 of the light bulb 54 may extend The main body of the illustrated light bulb generally comprises the structure of the bulb that encases the illuminating element (i.e., the filament). The opening 120 is desirably large enough to allow the body 122 of the light bulb 54 to be recessed within the support 112.

Figure 12:
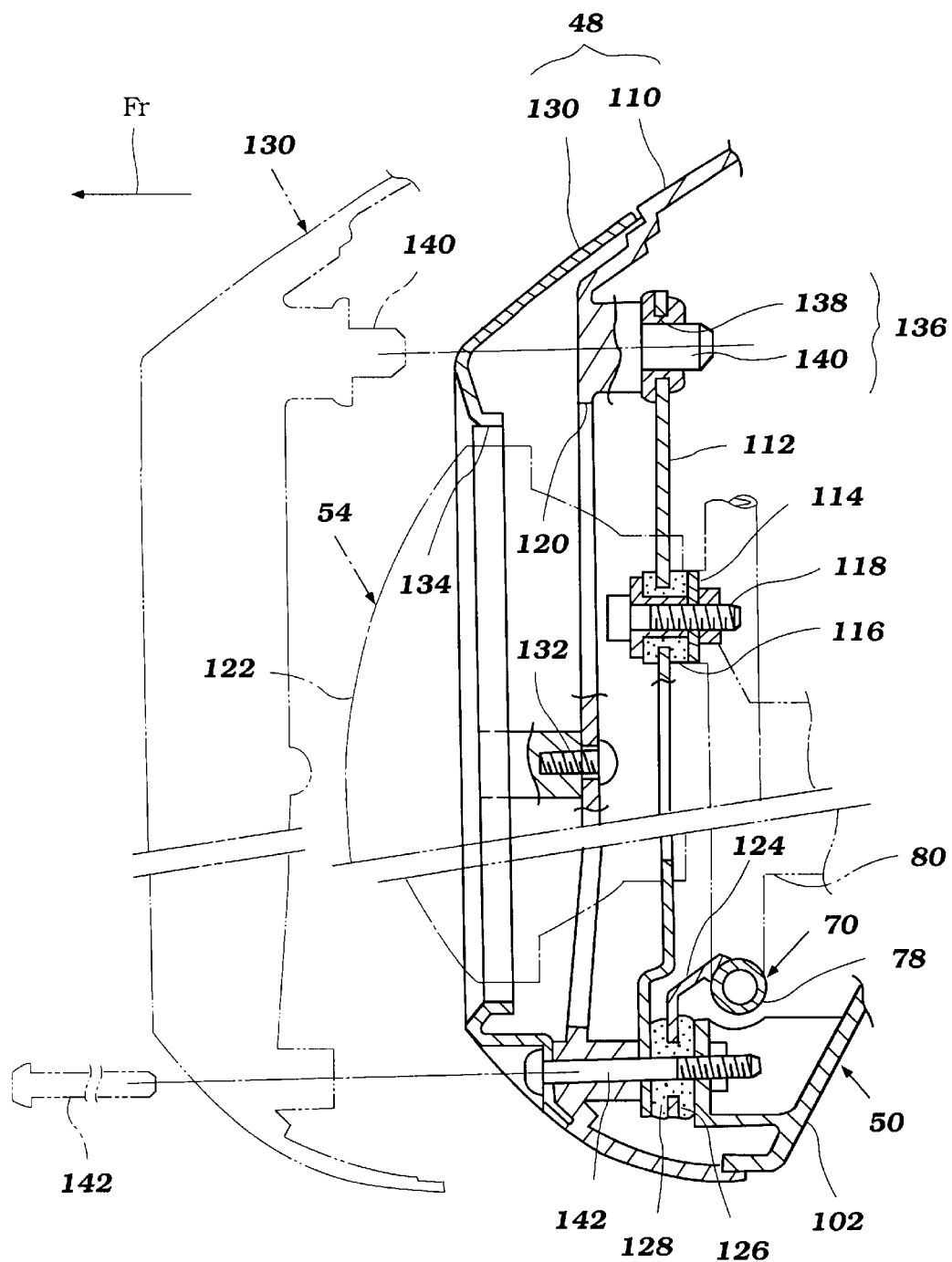
FIG. 12 is a sectioned side view taken through the headlight illustrating a head lamp mounting arrangement for the illustrate ed motorcycle of FIG. 1.

With reference now to FIG. 12, the headlight mounting arrangement will be described in more detail. As illustrated in FIG. 5, a tab 124 preferably depends downward from a lower portion of the main body 78 of the stay 70. This tab 124 includes an aperture 126. The aperture 126 can accommodate a resilient grommet 128, as illustrated best in FIG. 12. This grommet may be manufactured from any suitable material but preferably is a soft rubber compound that decreases the transmission of vibratory energy from the frame 22 through the stay 70 and into the light bulb 54 and the outer panel 48 of the illustrated fairing 42.

With continued referenced to FIG. 12, a lower portion of the lower panel 102 of the inner panel 50 is also secured to the tab 124. The rubber grommet 128 is desirably interposed between the surfaces of the tab 124 and the lower panel 102. This reduces transmission of vibrations to the inner panel 50 as well.

The light 54 is desirably secured within a head light rim 130. The head light rim 130 preferably forms a portion of the outer panel 48, as illustrated in FIG. 12. Threaded fasteners 132 can be used to secure the light body 122 in position within the rim 130. The rim 130 includes an opening 134 to accommodate the body 122 of the light bulb 54. Additionally, as illustrated best in FIG. 6, a pair of engaging members indicated generally by the reference numeral 136, are positioned in two locations about the circumference of the head light rim 130. With reference again to FIG. 12, the engaging members 136 generally comprise a resilient grommet 138 that is positioned within an aperture in the support 112 and a peg 140 that is attached to a portion of the head light rim 130. Thus the peg 140 may be inserted into the grommet 138 to positively locate the head light rim 130 consistently relative to the body 110 of the outer panel 48. Once positioned using the engaging means 136, the light bulb 54 and the head lamp rim 130 can be secured in position through the use of a threaded fastener 142.

Thus, the light bulb 54 may be repeatedly removed and consistently relocated during servicing of the motorcycle 20. Moreover, the rim 130 preferably is located within a recess positioned along the body 110 of the outer panel 48. In this manner, the periphery of the head light rim 130 may accommodate various tolerances that commonly are found in serial manufacturing of motorcycles. In addition, the outer rim 130 of the head light 54 engages a portion of the lower panel 102 of the inner panel 50, as illustrated best in FIG. 12. Because the tab 124 locates both the support 112 and the lower panel 102, and because the rim 130 is located relative to the support 112 through the use of the engaging structure 136, the repeated replacement of the light bulb 54 within the openings 134, 120 will result in consistent placement time and time again.

With reference again to FIG. 4, the electronic components 56, which include the display unit 58 and the audio unit 60 in the illustrated motorcycle 20, are preferably attached to the stay 70 through the use of threaded fasteners 144. As illustrated, forward faces of the electronic components 56 preferably extend through the inner panel 50. Desirably, a vibration dampening component 146 is positioned between the surfaces of the brackets of the stays 70 and the surfaces of the electronic components 56. These dampening components 146 desirably reduce the transmission of vibratory energy between the frame 22 and the electronic components 56.

Figure 7:
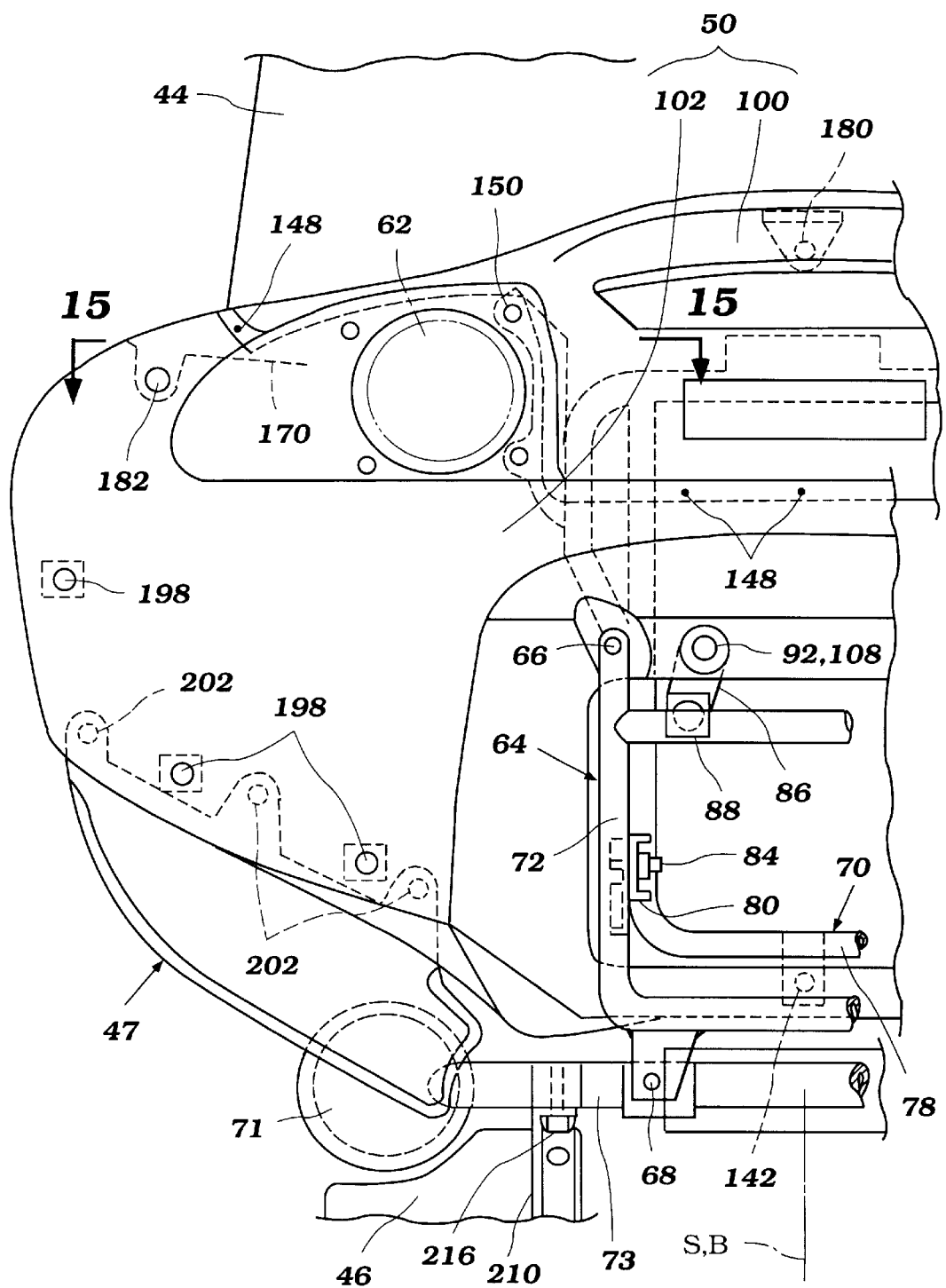
FIG. 7 is a further enlarged front view of the motorcycle portion of FIG. 1.
Figure 8:
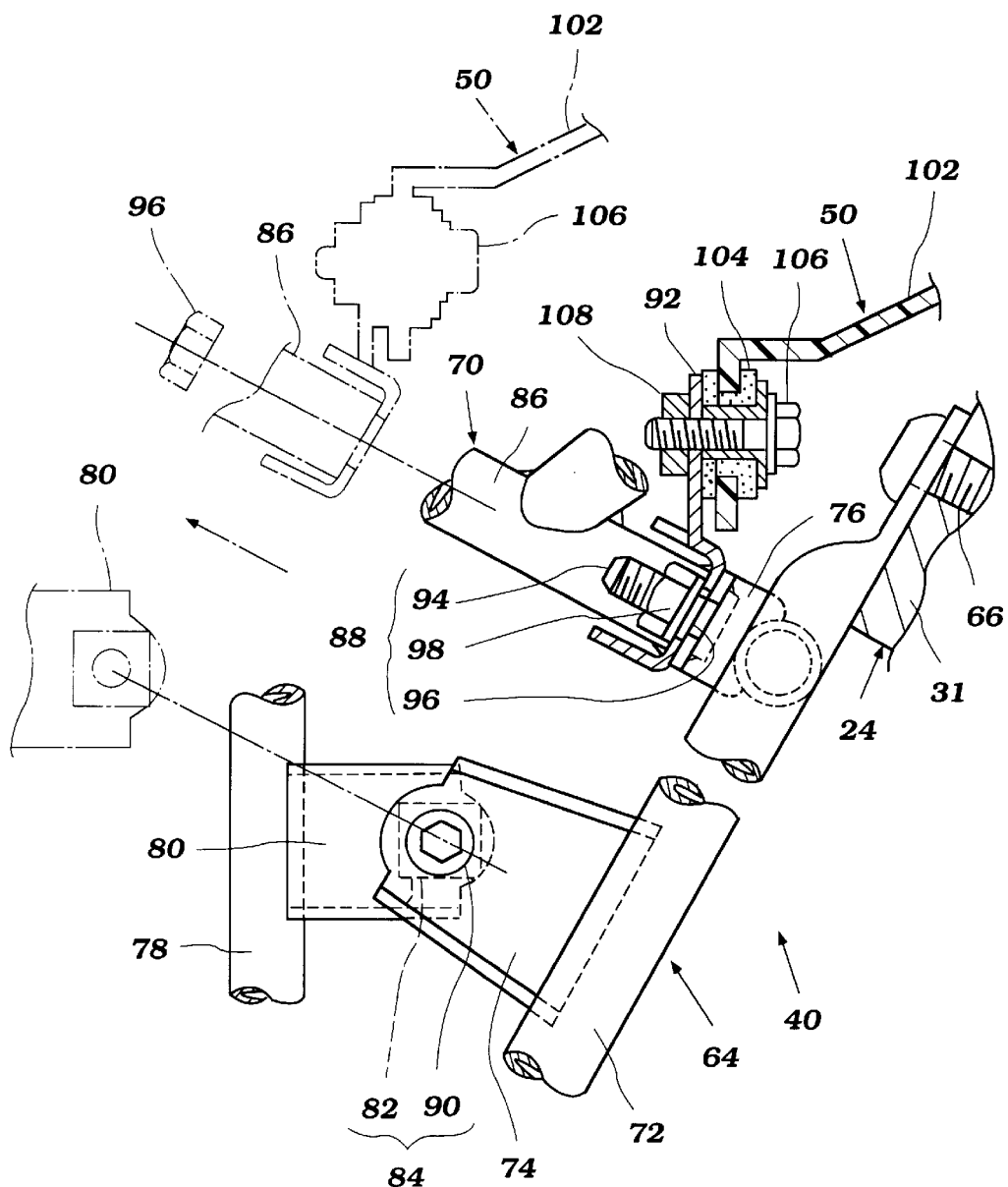
FIG. 8 is an enlarged and partially sectioned side view of a mounting arrangement for the fairing with certain components illustrated in phantom lines in a second position and in solid lines in a first position.

With reference to FIG. 7, the inner panel 50 preferably comprises an upper panel 100 and a lower panel 102. The two are preferably welded together in a seam as indicated at reference numeral 148. The welding secures the upper panel 100 and the lower panel 102 together following assembly of the motorcycle 20 in the illustrated embodiment. Of course, other fastening arrangements may also be used to connect the upper panel 100 and the lower panel 102 of the inner panel 50.

Figure 15:
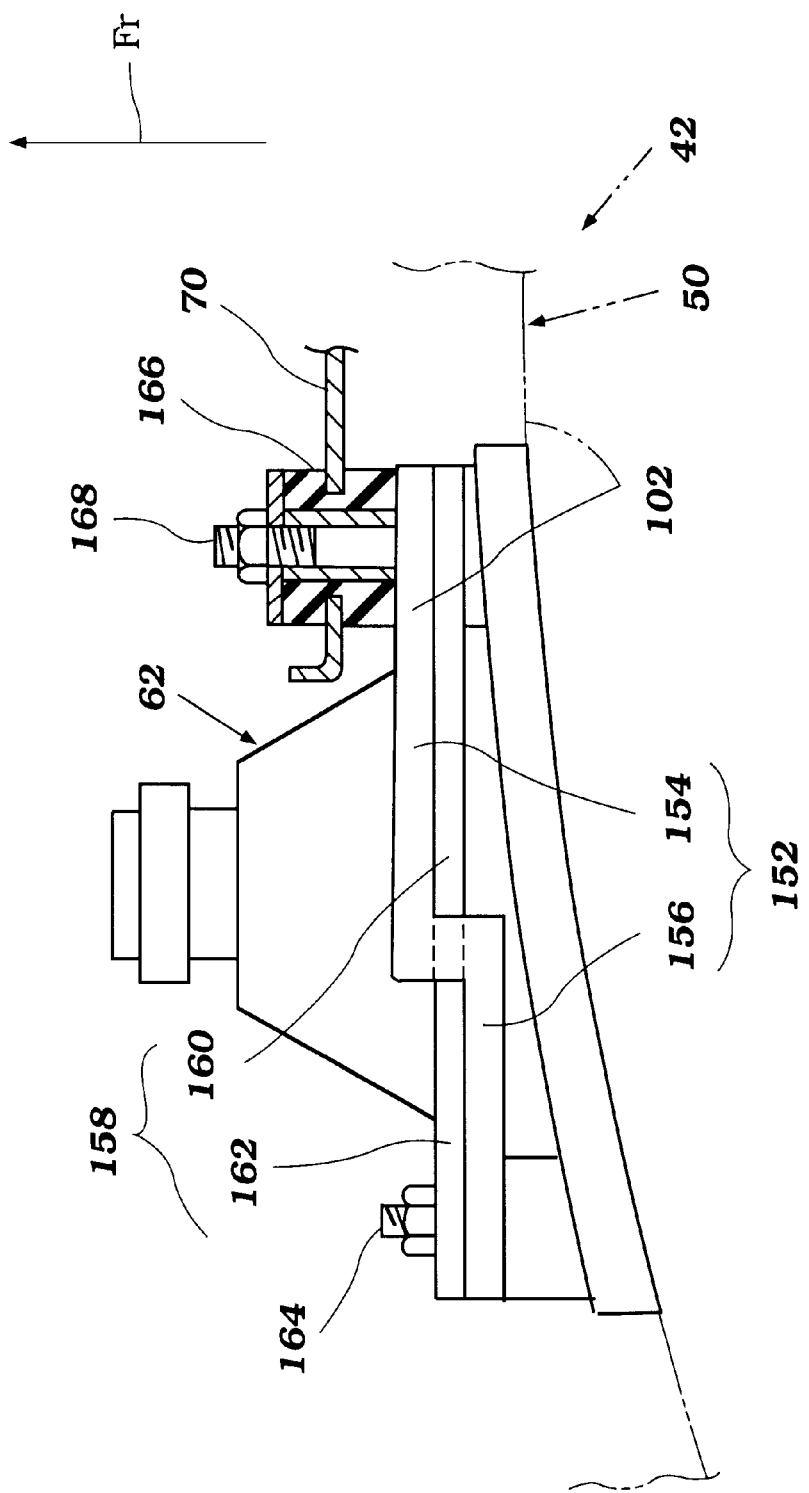
FIG. 15 is a sectioned top view of a mounting arrangement for a speaker within the inner panel of the fairinge of FIG. 1 taken along the line 15—15 in FIG. 7.

In addition, the speaker 62 preferably is mounted to the stay 70 through the use of fasteners 150. With reference to FIG. 15, this mounting arrangement for the speaker 62 will be described in detail. Specifically, as illustrated, a mounting flange 152, which comprises an inner surface 154 and an outer surface 156 abuts a flange 158 of the speaker 62, which also has an inner surface 160 and an outer surface 162. The flanges are attached to the lower panel 102 through the use of a threaded fastener 164. Also the flanges 152, 158 are connected to a resilient buffer member 166 through the use of a threaded fastener 168. The resilient buffer member 166 is interposed between a portion of the stay 70 to form a connection between the inner panel 102 and the stay 70. Of course, any other suitable method of attaching the speaker 62 to the stay 70 can also be used.

Figure 6:
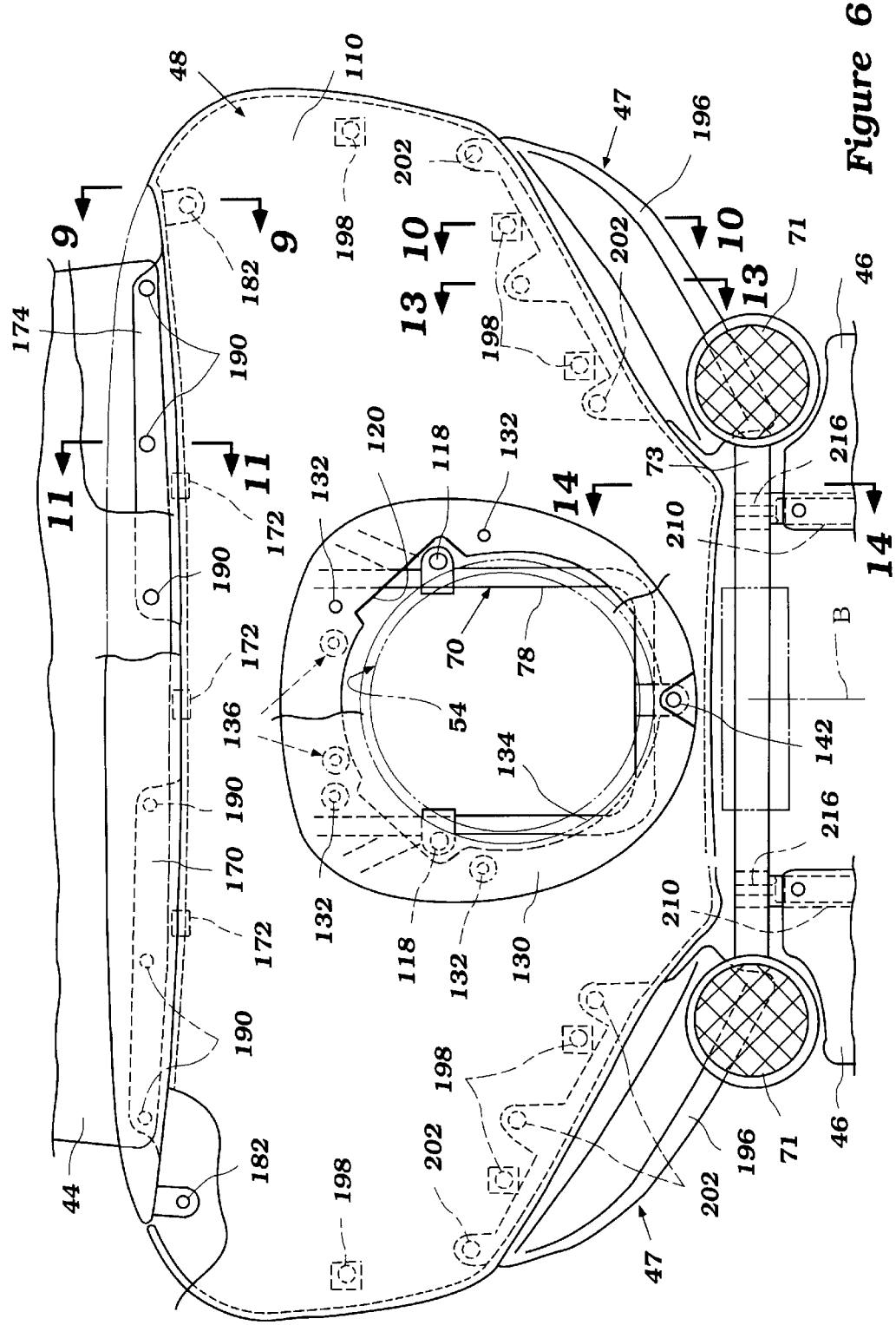
FIG. 6 is an enlarged partially sectioned front view of the motorcycle portion of FIG. 1.

With reference now to FIG. 4, the windshield 44 is desirably interposed between a portion of the outer panel 48 and inner panel 50. Preferably a rubber seal or a gasket, indicated generally by the reference numeral 170, covers the connection between the windshield 44 and the outer panel 48. The gasket 170 preferably snaps into position along the outer panel through the use of fasteners 172 that are positioned along an edge of the outer panel 48. The fasteners 172 are best illustrated in FIG. 6 and are spaced along a forward edge of the windshield 44. This arrangement allows the outer panel 48 to be repeatedly removed and installed easily.

With continued reference to FIG. 4, a stay 174 is preferably mounted to an upper tab 176 of the fairing stay 70. As illustrated in FIG. 5, the tab 176 preferably includes a plurality of apertures 178 that receive threaded fasteners or the like, which are generally indicated by the reference numeral 180 in FIG. 4. A threaded fastener 180 preferably attaches the illustrated inner panel 50 to the stay 174 such that the inner panel 50 is mounted to the stay but removably connected through the stay to the outer panel 48. While the outer panel may still be removed from the stay while the inner panel remains connected to the stay.

Figure 9:
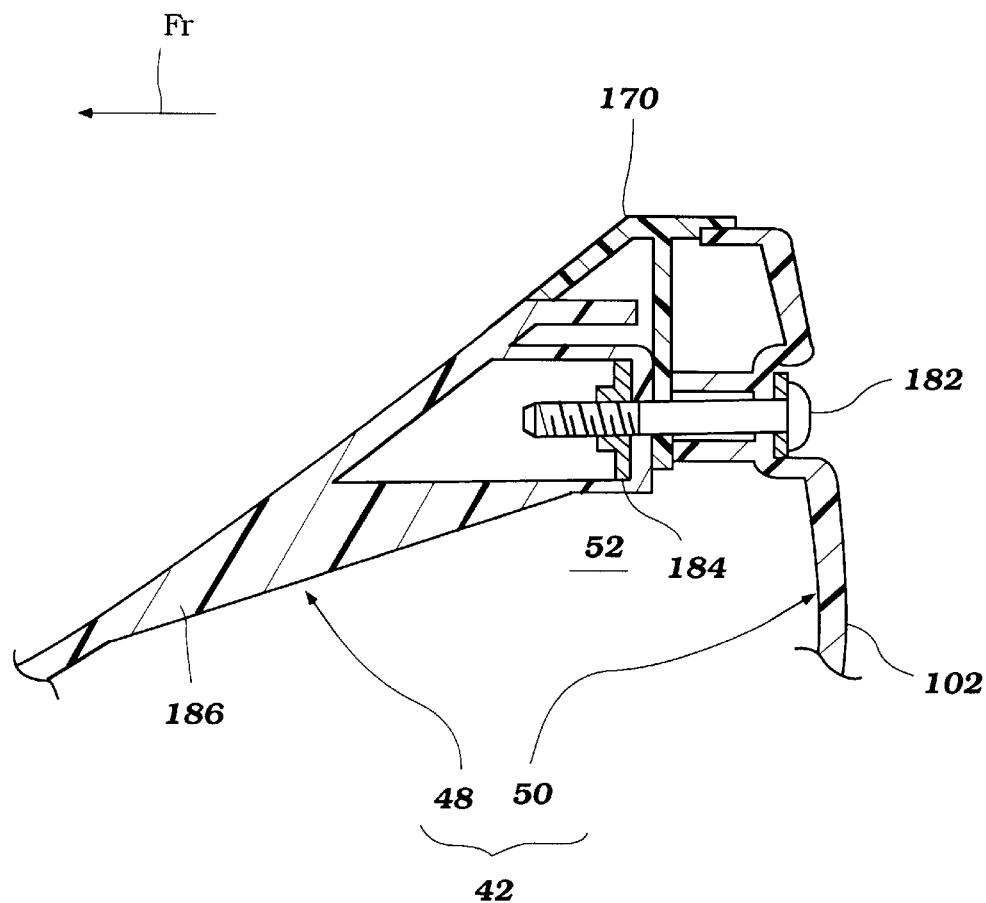
FIG. 9 is a sectioned side view of FIG. 6 taken along the line 9—9.

With reference now to FIG. 9, the outer panel 48 and the inner panel 50, which together form at least a portion of the fairing 42, are connected together with a portion of the gasket 170 interposed there between. Specifically as shown in FIG. 9, the lower panel 102 extends up around the speaker 62 and includes an opening through which a threaded fastener 182 extends. The fastener 182 engages with a threaded insert 184 positioned within a recess of the body 186 of the outer panel 48. Interposed between the body 186 of the outer panel 48 and the lower panel 102 is at least a portion of the gasket 170. This provides a seal between the two panel portions 48, 50 and results in a weather tight inner compartment or cavity 52 being defined between the two panel portions. This water tight connection or weather tight connection is preferably along at least an upward facing portion of the fairing 42 to reduce the amount of moisture that seeps into the cavity 52 in which electronic components 56 are positioned.

Figure 11:
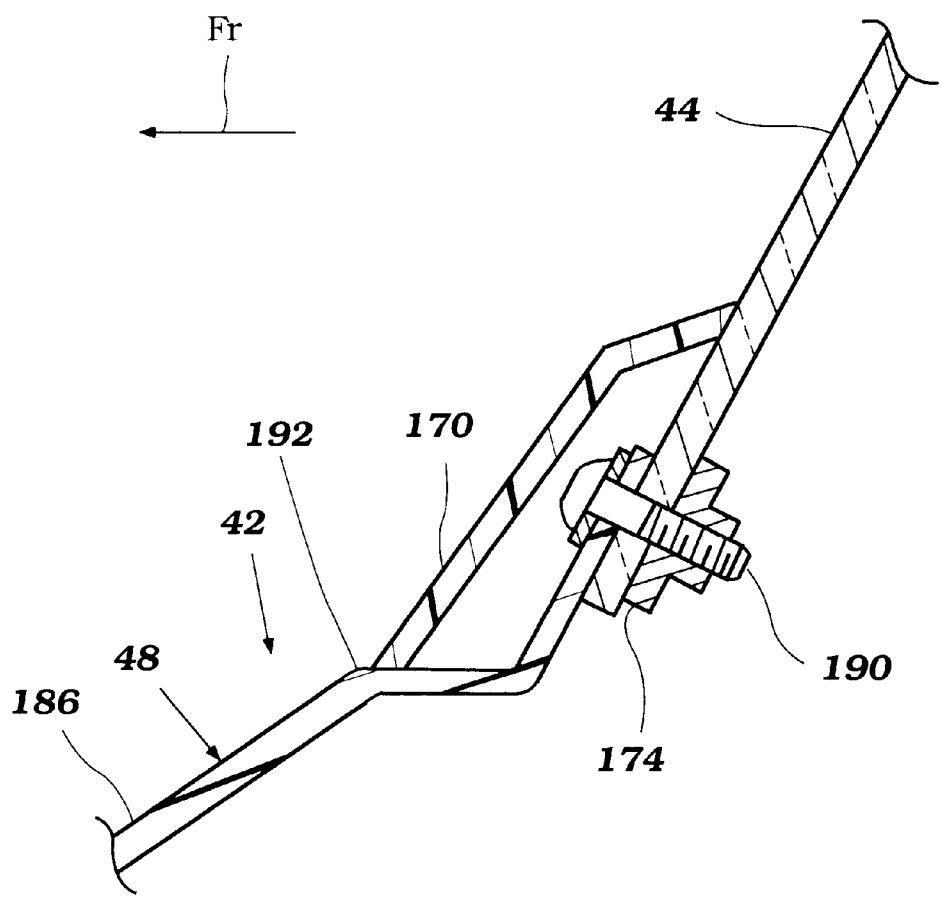
FIG. 11 is a sectioned side view of FIG. 6 taken along the line 11—11.

Similarly, with reference now to FIG. 11, the windshield 44 is also connected to the stay 174 and the outer panel 48. As illustrated, a portion of the windshield 44 is interposed between the body 186 of the outer panel 48 and the stay 174. A threaded fastener 190 is used to attach the three components together in the illustrated embodiment. Moreover, a portion of the gasket 170 abuts the windshield 44 and a second portion of the gasket 170 abuts at least a portion of the outer panel 48. A small horizontal shelf 192 that is formed at the intersection of the illustrated gasket 170 and the body 186 of the outer panel 48 is substantially covered by the illustrated gasket 170. This advantageously results in less available surface area for standing water and the like. As discussed above, a side shield 47 is desirably positioned proximate a lower surface of the fairing 42. The shield 47 preferably includes a grooved surface 196 to aid the flow of air to the sides of the motorcycles 20 when moving in the direction indicated by the arrow FR. These grooves, which are indicated generally by the reference numeral 196, extend rearwardly and upwardly along the shield 47. As also illustrated in FIG. 13, the groves 196 are formed along a lower portion of the shields 47 to deflect wind indicated generally by the letter W in FIG. 13.

Figure 10:
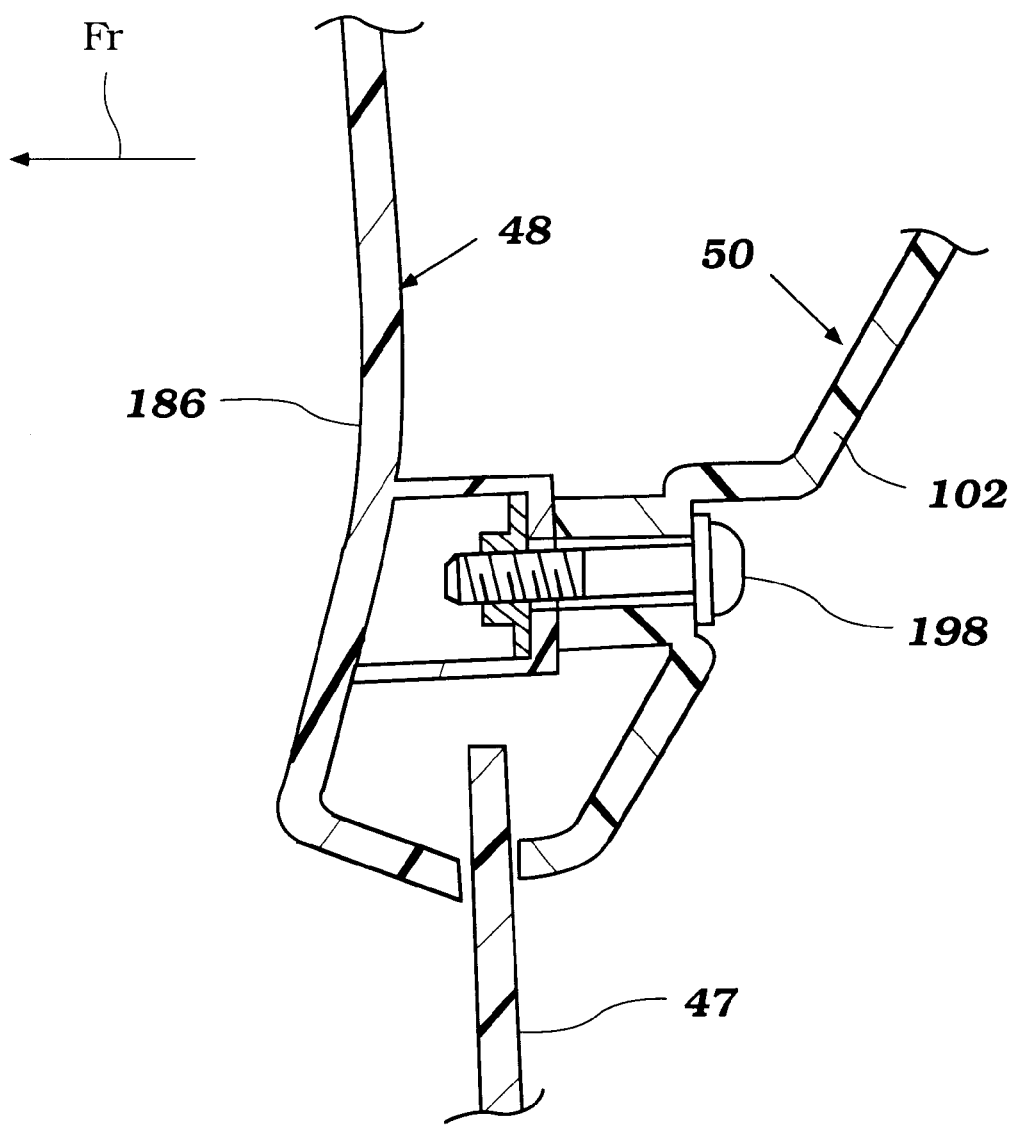
FIG. 10 is a sectioned side view of FIG. 6 taken along the fine 10—10.

With reference now to FIG. 10, the shield 47 extends into a gap formed between a lowermost portion of the outer panel 48 and the lower panel 102. In this location, which is shown in FIG. 10, the lower panel 102 and the body 186 of the outer panel 48 are joined together by a threaded fastener 198. Of course, other connecting methods may also be used. As illustrated in FIG. 6, the threaded fasteners 198 may be disposed around a parameter defined between the outer surface 48 and inner surface 50. Preferably six threaded fasteners 198 are used, however, it is anticipated more or less threaded fasteners may be used depending upon the application.

Figure 13:
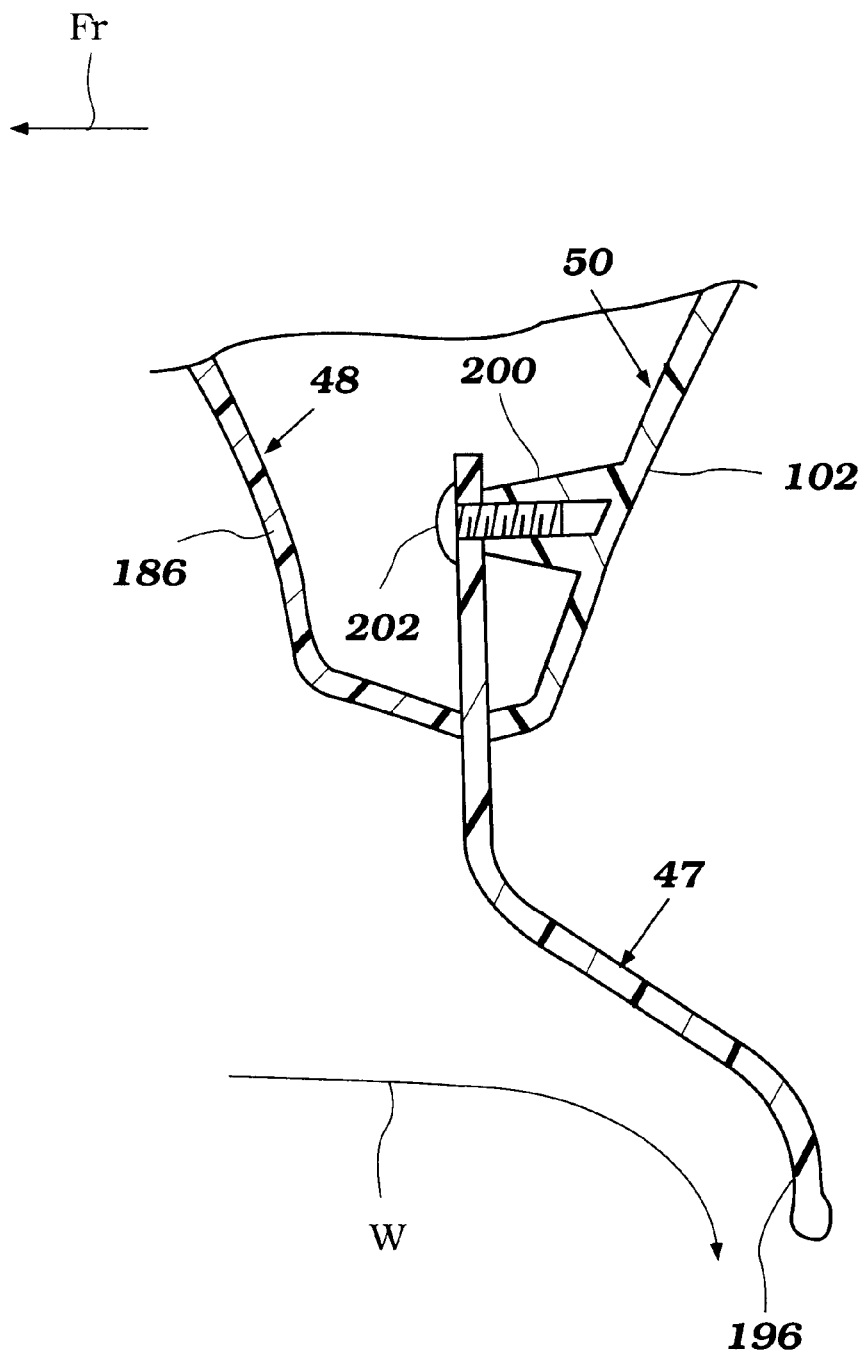
FIG. 13 is a sectioned side view of FIG. 6 taken along the line 13—13.

With reference now to FIG. 13, the illustrated shield 47 is connected into a portion of the lower panel 102 of the inner panel 50 and abuts the body 186 of the outer panel 48 at a lower edge. The shield 47 is desirably secured to a mounting boss 200 formed in the lower panel 102 through threaded fasteners 202. Of course, the shield 47 could be attached to the outer panel 186; however, attaching the shield 47 to the inner panel 50 insures that, upon removal of the outer panel 48, the shield 47 remains attached to the motorcycle 20. In this manner, the weight of the outer panel 48 may be reduced. Additionally, scratching and damage to the shield 47 may be reduced as the inner panel 50 commonly will remain attached to the motorcycle 20 during servicing.

Figure 14:
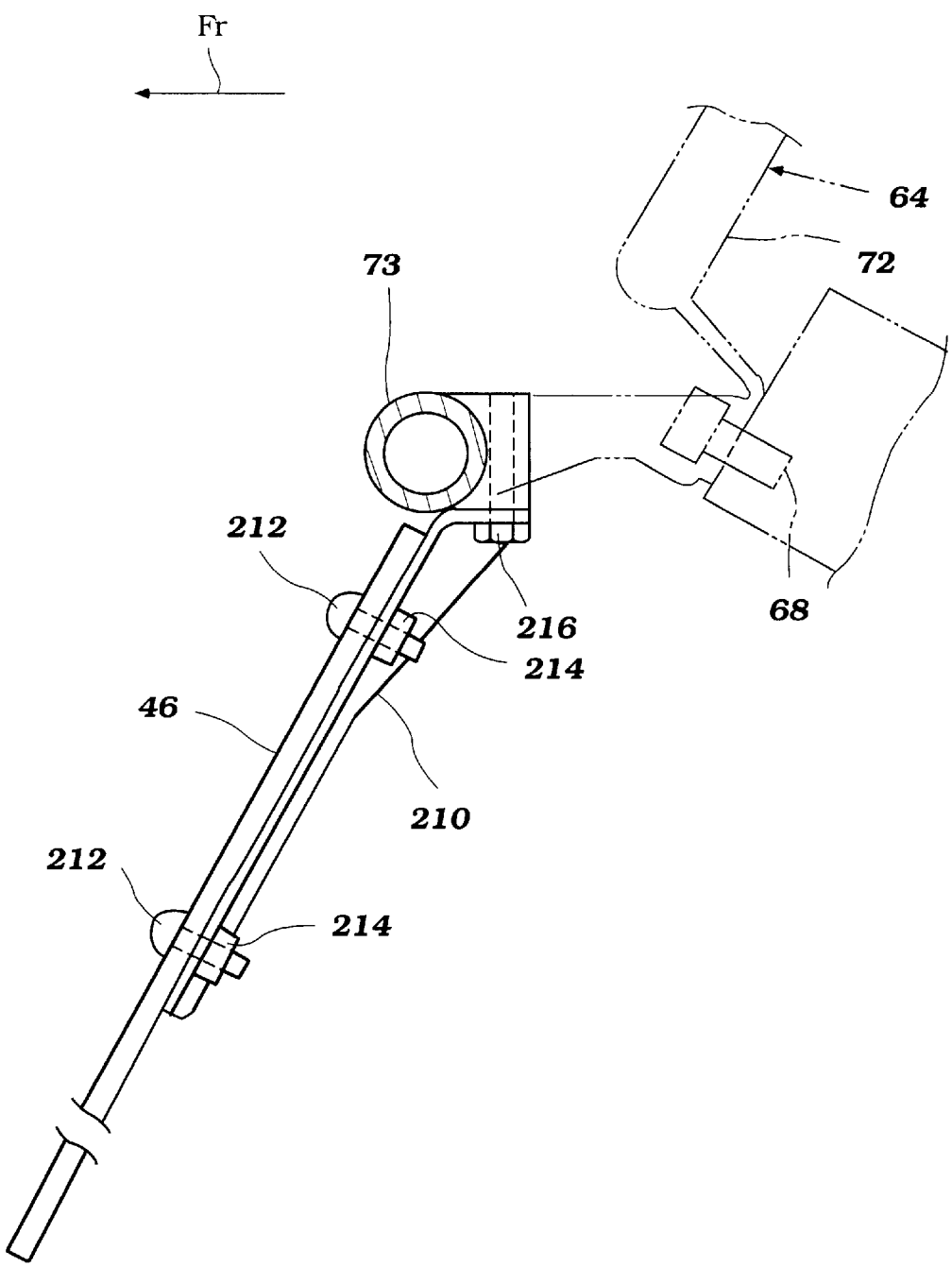
FIG. 14 is a sectioned side view of FIG. 6 taken along the line 14—14.

As also discussed above, a further shield 46 is also attached to the illustrated motorcycle 20 to deflect wind. With reference to FIG. 14, the shield 46 is attached to the bracket 64 through the use of the threaded fastener 68 and the bracket 73, which also secures the flasher 71 to the bracket 64. Specifically as illustrated in FIG. 14, a carrying flange 210 is attached to the shield 46 through the use of fasteners 212. While any suitable fastener may be used, preferably the fasteners are threaded and engaged with weld nuts 214 positioned along the carrying flange 210. The carrying flange 210, in turn, is preferably secured to a portion of the bracket 73 through the use of an additional fastener 216. The fastener 216 preferably engages within a threaded opening or aperture formed within the bracket 73; however, the fastener 216 can in some embodiments be threaded into a weld nut or the like positioned along the bracket 73, for instance.

As will be understood upon review of the above description of the present invention, the above described fairing 42 improves the serviceability of the motorcycle 20. Specifically the outer portion 48 of the fairing 42 is removable relative to the inner portion of the fairing. Upon removal of the front panel or outer panel 48 of the present fairing 42, the lateral and the forward sides of a cavity or compartment in which the electronic components 56 are mounted are revealed. Thus, the serviceability of the electronic components is dramatically increased over prior arrangements of fairings wherein only a small access opening was provided. Moreover, due to the advantageous mounting arrangement of the head light 54 within the outer panel 48, the outer panel 48 and the head light 54 may be repeatedly removed for servicing and reinstalled while maintaining a close fit between the headlight cover or rim 130 and the outer panel 48. Thus the attractive aesthetic appearance of the motorcycle may be maintained even after repeated servicing. Thus, the motorcycle 20 may be rapidly serviced without having to disassemble a complicated structure.

Although the present invention has been described in terms of a certain embodiment, other embodiments apparent to those of ordinary skill in the art also are within the scope of this invention. Thus, various changes and modifications may be made without departing from the spirit and scope of the invention. For instance, not all of the features, aspects and advantages are necessarily required to practice the present invention. Accordingly, the scope of the present invention is intended to be defined only by the claims that follow.

What is claimed is:

1. A fairing assembly for attaching to a frame of a motorcycle, the fairing assembly comprising at least one mounting bracket, the mounting bracket capable of being connected to a forward portion of the frame of the motorcycle, a fairing stay being removably connected to said mounting bracket, a forward fairing panel connected to said fairing stay and a rearward fairing panel connected to said fairing stay, said forward fairing panel being removable from said fairing stay separate from said rearward fairing panel such that said forward fairing panel may be removed from said fairing stay while said rearward fairing panel remains connected to said fairing stay, a cavity being defined by said forward fairing panel and said rearward fairing panel, said fairing stay being disposed within said cavity and said fairing stay supporting at least one accessory disposed substantially within said cavity such that said rearward fairing panel, said accessory and said stay may be removed from said mounting bracket as a single component.

2. The assembly of claim 1, wherein a forward and lateral side of said cavity is exposed when said forward fairing panel is removed.

3. The assembly of claim 1, wherein said bracket includes a bolt and said fairing stay includes a hole that cooperates with said bolt to attach said fairing stay to said bracket.

4. The assembly of claim 3, wherein said bolt extends at an angle relative to a horizontal plane that extends through the motorcycle.

5. The assembly of claim 1 further comprising a support and a headlamp that is supported by said support, said support being connected to said fairing stay and said headlamp extending through said forward fairing panel.

6. The assembly of claim 5, wherein said headlamp is positively positioned relative to said forward fairing panel using engaging pins.

7. The assembly of claim 6, wherein said headlamp is positively positioned relative to said forward fairing panel using two engaging pins that are insertable into a corresponding two apertures connected to said support.

8. The assembly of claim 1 further comprising at least one side shield that extends downward below at least a portion of said forward fairing panel and that is attached to at least one of said fairing stay or said rearward fairing panel.

9. The assembly of claim 8, wherein said side shield is connected to said rearward fairing panel.

10. A motorcycle comprising a frame assembly, said frame assembly comprising a pivotal front fork, handlebars being attached to said front fork, a fairing stay being removably secured to a forward portion of said frame assembly, at least one accessory being mounted to said fairing stay proximate said handlebars, an outer panel being removably attached to said fairing stay and said outer panel having a pair of side portions extending outward and rearward from a forwardmost portion of said outer panel such that said outer panel has a generally concave appearance to an operator, an inner panel also being removably attached to said stay, said stay being interposed between at least a portion of said outer panel and said inner panel, a windshield extending upward from an upper edge of said outer panel and being interposed between said outer panel and said inner panel at a lower edge of the windshield, said outer panel being removable from said motorcycle without removing said stay, said inner panel or said windshield, and said outer panel concealing front and lateral sides of a cavity, said cavity housing said at least one accessory.

11. The motorcycle of claim 10, wherein said outer panel and said inner panel abut one another in at least one location.

12. The motorcycle of claim 11, wherein a bracket connects said windshield to said stay and said outer panel is connected to said bracket.

13. The motorcycle of claim 12 further comprising a gasket that covers at least a portion of a connection between said bracket and said outer panel.

14. The motorcycle of claim 10, wherein said accessory is a display device.

15. The motorcycle of claim 10 further comprising a headlight being removably attached to said stay.

16. The motorcycle of claim 15, wherein said headlight is mounted in a rim and said rim overlaps a portion of said outer panel.

17. The motorcycle of claim 16, wherein said portion of said outer panel at least partially overlaps a portion of said inner panel.

18. The motorcycle of claim 10 further comprising at least two shields removably mounted to said stay with a bracket.

19. The motorcycle of claim 10 further comprising at least two shields removably and directly mounted to said inner panel.

20. The motorcycle of claim 10 further comprising means for reducing translation of vibrational energy from said frame assembly to a fairing, said fairing comprising said inner panel and said outer panel.

21. A fairing assembly for attaching to a frame of a motorcycle, the fairing assembly comprising at least one mounting bracket, the mounting bracket capable of being connected to a forward portion of the frame of the motorcycle, a fairing stay being removably connected to said mounting bracket, a forward fairing panel connected to said fairing stay and a rearward fairing panel connected to said fairing stay, said forward fairing panel being removable from said fairing stay separate from said rearward fairing panel such that said forward fairing panel may be removed from said fairing stay while said rearward fairing panel remains connected to said fairing stay, a cavity being defined between said forward fairing panel and said rearward fairing panel, said fairing stay supporting at least one accessory disposed substantially within said cavity such that said rearward fairing panel, said at least one accessory and said stay being capable of removal from said mounting bracket as a single component, and a headlamp that is supported by said support, said support being connected to said fairing stay and said headlamp extending through said forward fairing panel.

22. The assembly of claim 21, wherein said headlamp is positively positioned relative to said forward fairing panel using engaging pins.

23. The assembly of claim 22, wherein said headlamp is positively positioned relative to said forward fairing panel using two engaging pins that are insertable into a corresponding two apertures connected to said support.

24. A motorcycle comprising a frame assembly, a front fork being pivotably connected to said frame assembly, handlebars being attached to said front fork, a fairing stay being removably secured to a forward portion of said frame assembly, at least one accessory being mounted to said fairing stay proximate said handlebars, an outer panel being removably attached to said fairing stay and said outer panel having a pair of side portions extending outward and rearward from a forwardmost portion of said outer panel such that said outer panel has a generally concave appearance to an operator, an inner panel also being removably attached to said stay, a windshield extending upward from an upper edge of said outer panel and being interposed between said outer panel and said inner panel at a lower edge of the windshield, said outer panel being removable from said motorcycle without removing said stay, said inner panel or said windshield, and said outer panel concealing front and lateral sides of a cavity, said cavity housing said at least one accessory, wherein said outer panel and said inner panel abut one another in at least one location.

25. The motorcycle of claim 24, wherein a bracket connects said windshield to said stay and said outer panel is connected to said bracket.

26. The motorcycle of claim 25 further comprising a gasket that covers at least a portion of a connection between said bracket and said outer panel.

27. A motorcycle comprising a frame assembly, a front fork being pivotably connected to said frame assembly, handlebars being attached to said front fork, a fairing stay being removably secured to a forward portion of said frame assembly, at least one accessory being mounted to said fairing stay proximate said handlebars, an outer panel being removably attached to said fairing stay and said outer panel having a pair of side portions extending outward and rearward from a forwardmost portion of said outer panel such that said outer panel has a generally concave appearance to an operator, an inner panel also being removably attached to said stay, a windshield extending upward from an upper edge of said outer panel and being interposed between said outer panel and said inner panel at a lower edge of the windshield, said outer panel being removable from said motorcycle without removing said stay, said inner panel or said windshield, and said outer panel concealing front and lateral sides of a cavity, said cavity housing said at least one accessory, wherein said at least one accessory is a display device.

28. A motorcycle comprising a frame assembly, a front fork being, pivotably connected to said frame assembly, handlebars being attached to said front fork, a fairing stay being removably secured to a forward portion of said frame assembly, at least one accessory being, mounted to said fairing stay proximate said handlebars, an outer panel being removably attached to said fairing stay and said outer panel having a pair of side portions extending outward and rearward from a forwardmost portion of said outer panel such that said outer panel has a generally concave appearance to an operator, an inner panel also being removably attached to said stay, a windshield extending upward from an upper edge of said outer panel and being interposed between said outer panel and said inner panel at a lower edge of the windshield, said outer panel being removable from said motorcycle without removing said stay, said inner panel or said windshield, and said outer panel concealing front and lateral sides of a cavity, said cavity housing said at least one accessory and a headlight being removably attached to said stay.

29. The motorcycle of claim 28, wherein said headlight is mounted in a rim and said rim overlaps a portion of said outer panel.

30. The motorcycle of claim 29, wherein said portion of said outer panel at least partially overlaps a portion of said inner panel.

* * * * *